US006704541B1

(12) United States Patent
Ciarallo et al.

(10) Patent No.: US 6,704,541 B1
(45) Date of Patent: Mar. 9, 2004

(54) METHOD AND SYSTEM FOR TRACKING THE PROGRESS OF STUDENTS IN A CLASS (75) Inventors: Anna Maria Ciarallo, Evanston, IL (US); Matthew R. Christensen, Evanston, IL (US); Enio Ohmaye, Wilmette, IL (US)

(73) Assignee: UNext.com, L.L.C., Deerfield, IL (US)

( * ) Notice: Subject to any disclaimer, the term of this patent is extended or adjusted under 35 U.S.C. 154(b) by 0 days.

(21) Appl. No.: 09/731,117

(22) Filed: Dec. 6, 2000

(51) Int. Cl.[7] .............................................. G09B 11/00
(52) U.S. Cl. ...................................... 434/362; 434/350
(58) Field of Search ................................ 434/322, 323, 434/350, 118, 365; 707/102–104; 705/1, 14

(56) References Cited

U.S. PATENT DOCUMENTS

| | | |
|---|---|---|
| 4,772,206 A | 9/1988 | Kerr et al. |
| 4,820,167 A | 4/1989 | Nobles et al. |
| 4,877,404 A | 10/1989 | Warren et al. |
| 5,002,491 A | 3/1991 | Abrahamson et al. |
| 5,267,865 A | 12/1993 | Lee et al. |
| 5,310,349 A | 5/1994 | Daniels et al. |
| 5,395,243 A | 3/1995 | Lubin et al. |
| 5,441,415 A | 8/1995 | Lee et al. |
| 5,597,312 A | 1/1997 | Bloom et al. |
| 5,727,950 A | 3/1998 | Cook et al. |
| 5,788,508 A | 8/1998 | Lee et al. |
| 5,810,605 A | 9/1998 | Siefert |
| 5,823,788 A | 10/1998 | Lemelson et al. |
| 5,823,789 A * | 10/1998 | Jay et al. ...................... 434/365 |
| 5,864,869 A * | 1/1999 | Doak et al. ............... 707/104.1 |
| 5,909,589 A | 6/1999 | Parker et al. |
| 5,957,699 A | 9/1999 | Peterson et al. |
| 5,974,446 A | 10/1999 | Sonnenreich et al. |
| 5,987,443 A | 11/1999 | Nichols et al. |
| 6,014,134 A | 1/2000 | Bell et al. |
| 6,024,577 A | 2/2000 | Wadahama et al. |
| 6,029,043 A | 2/2000 | Ho et al. |
| 6,039,575 A | 3/2000 | L'Allier et al. |
| 6,064,856 A | 5/2000 | Lee et al. |
| 6,149,441 A * | 11/2000 | Pellegrino et al. ........... 434/350 |
| 6,287,123 B1 * | 9/2001 | O'Brien ...................... 434/118 |
| 6,353,447 B1 * | 3/2002 | Truluck et al. ............. 434/350 |
| 2002/0055089 A1 * | 5/2002 | Scheirer ..................... 434/350 |

FOREIGN PATENT DOCUMENTS

WO    WO 98/22864    5/1998

OTHER PUBLICATIONS

Yahoo! Internet Life Magazine Names Dakota State University the #12 Most Wired College in the Country, http://www.dsu.edu/yahoo.htm: Nov. 23, 1998.
DSU Open Internet Courses, http://www.courses.dsu.edu/disted/courses.htm: Nov. 23, 1998.
Menu Pages for "The Commons", http://www.wcc–eun.com/wln/commons/index.html: Nov. 5, 1998.
Home Pages for University Without Walls At the University of Massachusetts Amherst, http://www.klaatu.oit.umass.edu/www.uww_home.html: Nov. 5, 1998.
Slide Show of Information Relating To Online Educational Programs, http://www.howardcc.edu/hcc/facpres/sld003.htm: Nov. 5, 1998 (Slides 3–13 of 14).

(List continued on next page.)

Primary Examiner—Teresa Walberg
Assistant Examiner—Kathleen M. Christman
(74) Attorney, Agent, or Firm—Brinks Hofer Gilson & Lione (57) ABSTRACT A method and system for tracking the progress of one or more students in a distance learning environment. The system includes a school computer and one or more student computers. A course site, including course graphics representative of course activities and progress graphics representative of individual students' progress in performing the course activities, allows school officials and/or students to track and compare their progress to those of other students in the class.

22 Claims, 4 Drawing Sheets

OTHER PUBLICATIONS

ADECand Virtual Universities "Toward Common Vision and Action", http://www.adec.edu/vuniv/adec/place1.html: Nov. 5, 1998.

SINEwave The COB Virtual Campus (Distance Learning at the College of Business at UCB), http://www.colorado.edu/infs/jcb/sinewave/service/virtualcampus/: Nov. 5, 1998.

Welcome to the California Virtual University, htt://www.california.edu/about.html: Nov. 5, 1998.

Article Discussing Design of Online University: Johnstone/Jones: Western Governors University, http://www.ttu.edu/lists/acw-1/9707/0078.html: Nov. 5, 1998.

Web Pages Relating To Western Governors University Website at http://www.wgu.edu/wgu/academics/dist_learning/html: Nov. 5, 1998.

Website for the University of Phoenix Online Campus at http://www.uophx.edu/online/on1_camp.htm: Nov. 5, 1998.

Printout of Website for: The Electronic University Network at http://www.wcc-eun.com/eun.html: Nov. 5, 1998.

Website Entitled Brevard Community College Online . . . Telecommute on the Information Super Highway with BCC, http://brevard.cc.fl.us/online/campus/: Nov. 5, 1998.

Web Page Entitled "Welcome to . . . Apollo Group, Inc.", http://www.apollogrp.com/: Nov. 5, 1998.

Micron University Home Page Entitled "Micron U" http://programs.micronpc.com/micro . . . OL1RTR4UWPBGP3&wherexhome&whyxgen: Nov. 4, 1998.

Meyrowitz, "Intermedia: The Architecture and Construction of an Object–Oriented Hypermedia System and Applications Framework", OOPSLA '86 Proceedings published Sep. 1986.

Bonar et al., "An Object–Oriented Architecture For Intelligent Tutoring Systems", OOPSLA '86 Proceedings published Sep. 1986.

Weyer et al., "A Prototype Electronic Encyclopedia", ACM Transactions on Office Information Systems, vol. 3, No. 1, Jan. 1985, pp. 63–88.

Article in Byte Magazine entitled "Difference in Higher Education" dated Feb. 1987.

Morris et al. "Andrew: A Distributed Personal Computing Environment", Communications of the ACM, Mar. 1986, vol. 29, No. 3.

Wiseman, "Teaching (Virtually) Teaching" http://gsula.gsu.edu/faculty/lawppw/vtt/virtual.html, Nov. 23, 1998.

Patent Abstracts of Japan, English Abstract for Japanese Application Publication No. 08235089 "Education Support System" Published Sep. 13, 1996.

Patent Abstracts of Japan, English Abstract for Japanese Application Publication No. 10040199 "Education Support System" Published Feb. 13, 1998.

\* cited by examiner

METHOD AND SYSTEM FOR TRACKING THE PROGRESS OF STUDENTS IN A CLASS

FIELD OF THE INVENTION

The present invention relates to a method and system for tracking the progress of students. In particular, the invention relates to a method and system for tracking the progress of one or more students in a class course and comparing that progress to the progress of other students in the class.

BACKGROUND

Methods of distance learning have become increasingly common in education. "Distance learning" relates to classes that are taught by instructors located at a location different or remote from the students in the class. In many instances, each student is at a different location from the other students in the class. These classes may be taught by videotape, a video communication link, audiotapes, or written correspondence. These courses are particularly useful for students who wish to continue full or part-time employment while they earn credits toward a degree. In addition, distance learning benefits students who would otherwise need to relocate in order to attend classes in person and do not wish to do so.

With the increase in access to the World Wide Web, it is now feasible to provide educational opportunities over communication links such as the Internet. Through the Internet, it is possible to connect remotely located students and faculty in a more affordable and timely manner.

A problem with distance learning programs is the inability to simulate a classroom atmosphere where students are motivated by the performance of their peer students. In traditional classroom-based education, interaction in a classroom setting makes a student naturally aware of his or her relative status amongst classmates in terms of his or her progress toward completing class work. In particular, students exposed to classroom interaction compare the amount of work they have completed, their attendance, their participation, and their performance on graded work with that of fellow students. These facets of education are lacking when a student is disconnected from a classroom setting, and thus students lose their motivation to improve their work compared to the work of their peer students.

Accordingly, there is a need for a method for tracking and comparing the progress of a member in a group when data is transmitted by a member via a communication link.

SUMMARY

According to one aspect of the invention, a method of tracking the progress of at least one student in a class course is provided. The method includes providing a computer network including a school computing system and one or more student computers connected by a communication link. Data relating to a course is stored in the school computing system, and then one or more course graphics representative of the course are generated. Information relating to performance of course activities is then transmitted from the one or more student computers to the school computing system via the communication link. Data relating to the progress of one or more students in the course based upon the transmitted information is then stored in the school computing system. Finally, one or more progress graphics representative of the progress of the one or more students in the course is generated.

In another aspect of the invention, a system for tracking the progress of one or more students in a class course is provided. The system includes a computer network having a school computing system and one or more student computers connected with the school computing system by a communication link. The school computing system includes one or more databases adapted to store data relating to the performance of course activities by one or more students in the course. The school computing system also includes a course graphic generator adapted to generate one or more course graphics representative of the course, and a progress graphic generator adapted to generate one or more progress graphics representative of the progress of the one or more students in the course.

Other aspects of the invention will be apparent to those skilled in the art in view of the appended claims.

DETAILED DESCRIPTION

Figure 1:
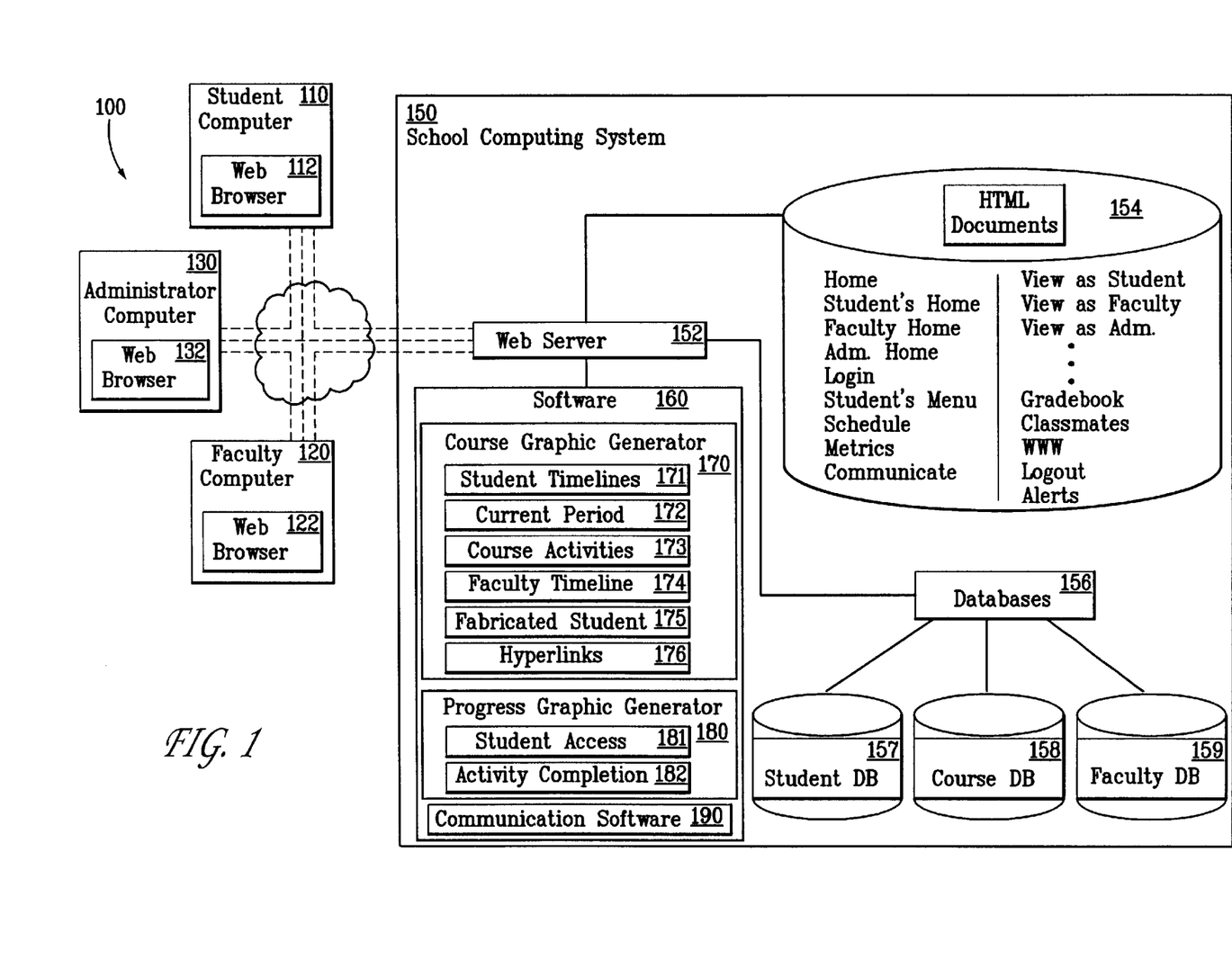
FIG. 1 is a schematic view of a system for tracking students' progress in a class course.

Referring initially to FIG. 1, a computer network for tracking and comparing the progress of students in a class course is shown generally at 100. The system 100 includes a student computer 110 and a school computing system 150. The student computer 110 is connected with the school computing system 150 by a communication link 140. The communication link may be any suitable link known in the art, such as the Internet or an intranet.

Preferably, a faculty computer 120, such as the course instructor's computer, and an school official or administrator computer 130 may also be included in the system, although in alternate embodiments faculty and administrators may gain access to the system through an interface (not shown) in the school computing system 150 itself. Although only one of each of a student computer 110, faculty computer 120, and an administrator computer 130 are shown in FIG. 1, those skilled in the art will appreciate that as many computers of each category may be connected with the school computing system in order to give the appropriate individuals access to the resulting network.

The school computing system 150 includes a server 152 capable of allowing access to HTML documents 154, software 160, and various databases 156. In the preferred embodiment, the software 160 is programmed using PHP, an open-source product. The server 152 is preferably an Apache Web Server, an open-source product maintained by the Apache Software Foundation of Forest Hill, Md. The databases 156 are preferably formatted using ORACLE database software, licensed and distributed by the Oracle Corporation, or alternately, using MySQL database software, available from MySQL AB. One suitable school computing system 150 is the ISIM$^{SM}$ University distance learning program based in Denver, Colo. and operated over the World Wide Web.

Students and school officials can access the server 152 through their Web browsers 112, 122, and 132 respectively. Each of the Web browsers 112, 122, 132 are connected to the server 152 and other computers in the system via the communication link 140. The operating details of communication links, such as the Internet, the use of HTML documents, and the software and formats used in client-server relationships, are now well known in the art, and therefore have not been included in the discussion that follows. A basic discussion of such of details is found in U.S. Pat. No. 6,029,141, the entire disclosure of which is incorporated herein by reference.

Figure 2:
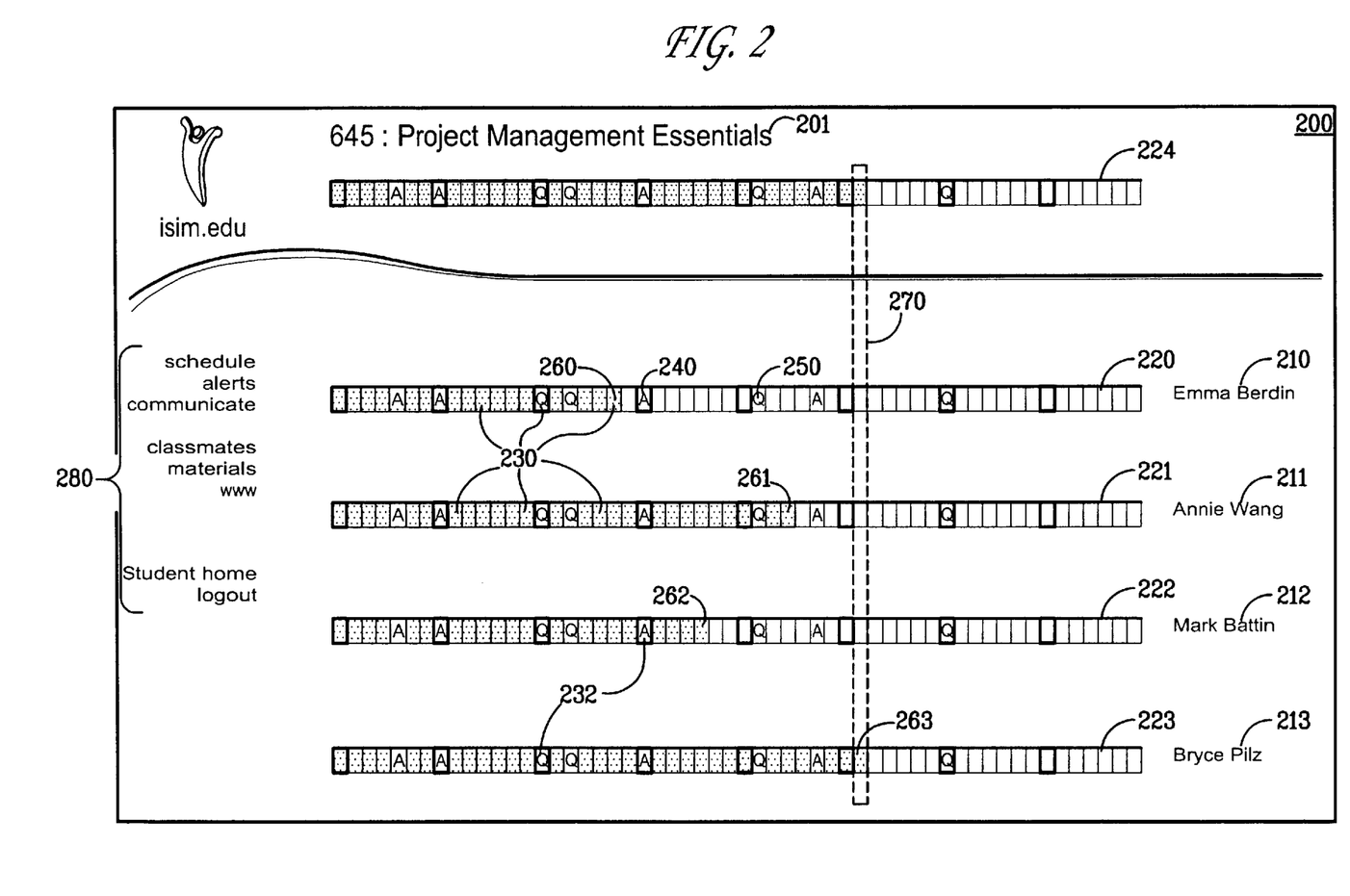
FIG. 2 is a plan view of one embodiment of a course site having course graphics and progress graphics.
Figure 3:
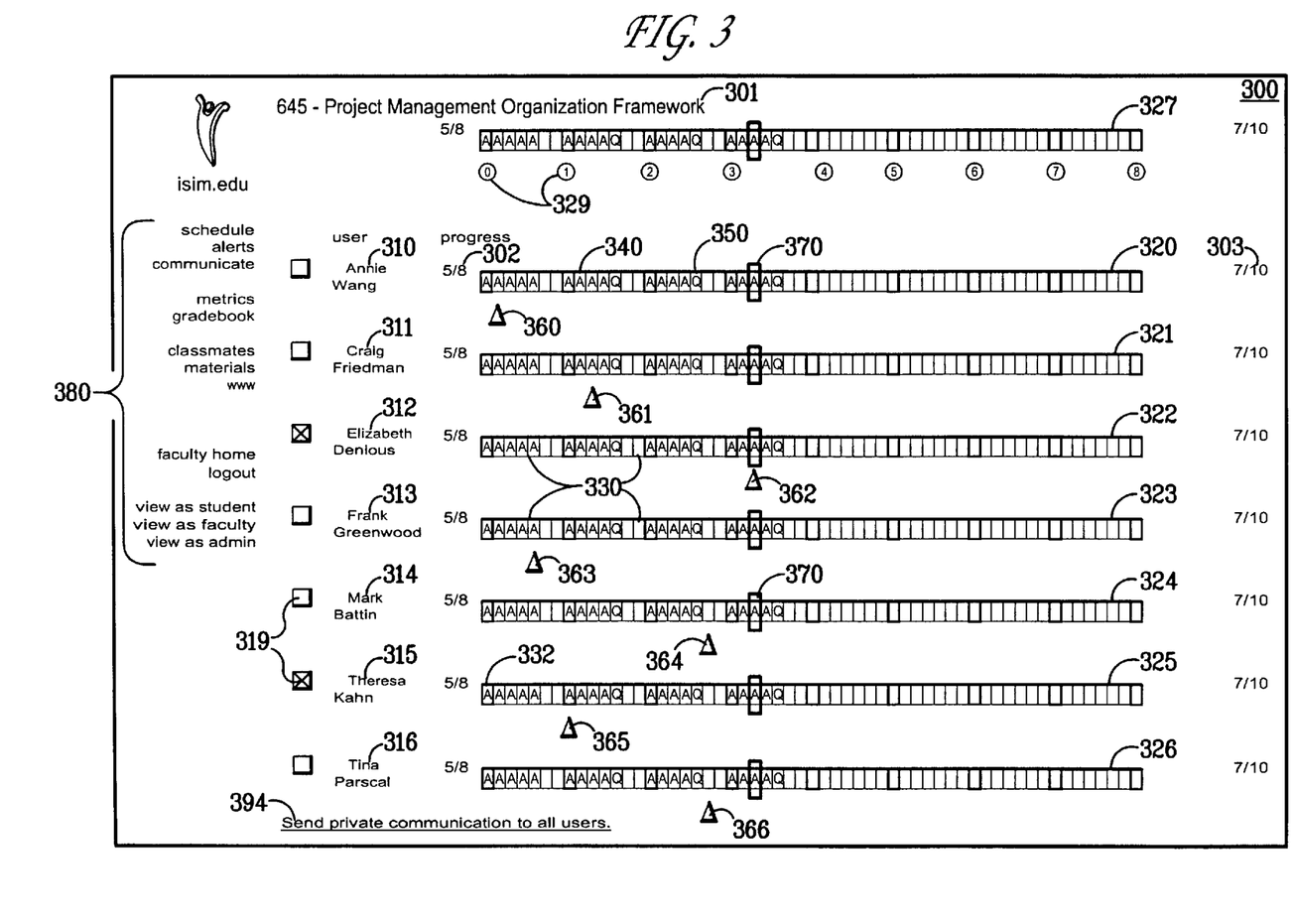
FIG. 3 is a plan view of a second embodiment of a course site having course graphics and progress graphics.

Referring to FIGS. 1–3, a student or school official can access HTML documents 154 through the Web server 152 via the communication link 140. One such HTML document may be a class course site 200 (FIG. 2). The course site 200 includes graphics and indicia that are either stored or based upon information stored in the databases 156, and/or are generated by the software 160, as more fully described below.

The course site 200 includes a course designator 201 for providing a description of the course, such as a course number and/or title. The course site 200 also includes student designators 210, 211, 212, 213, such as the name of the student, each representative of an actual student. Alternately, one or more of the student designators 210–213 may represent a "fabricated student," as more fully described below. The student designators 210–213 preferably list all of the students in the class course designated by course designator 201, or a selected section of the class. The course designator 201 and the student designators 210–213 are obtained by the server from the course database 158 and/or student database 157, respectively. In the embodiment of the invention shown, each student is represented by the student's full name. Alternatively, each student may be designated by a student number, the student's last name, or some other mark, such as a screen name or a pseudo-name, that is representative of a particular student. In another embodiment, the school officials may see the actual names in a "faculty view," whereas the students may see only the screen names or the like in a "student view".

The course site 200 also includes one or more course graphics representative of the course. The course graphics are generated by the course graphics generator 170. In the embodiment shown in FIG. 2, the course graphics are defined by course timelines 220, 221, 222, 223, and 224. Each of the timelines 220, 221, 222, and 223 are assignable to a particular student identified by the student designator 210–213 adjacent the respective timeline, and is representative of the schedule of course activities to be performed by the student in working to complete the course. The course timeline 224 near the top of the course site 200 is not for a student but is either representative of a schedule of activities to be performed by the class as a whole, or of activities to be performed by the instructor or faculty member in charge of the course. As shown, all of the course timelines 220–224 are preferably aligned with each other at their lateral ends in order to facilitate easy comparison of the graphics and positions of the indicators located therein. The course timelines 220–223 are generated by the course timeline generator software 171, whereas the timeline 224 is generated by the faculty timeline generator 174.

Each of the time lines 220–224 is divided into discrete time periods 230. Preferably, the time periods represent individual days of the course. Some of the time periods may be set apart from the rest, such as by using bolded borders for certain segments such as segments 232, in order to indicate a particular group of time periods. For example, when the time periods represent days, bolded borders may represent a certain day of the week (e.g., Mondays).

The course graphics may also include course activities indicators, such as assignment indicators 240, shown as an "A," and quiz indicators 250, such as a "Q". The course activity indicators identify the particular time period 230 for which a course activity, such as an assignment or quiz, is ideally completed. The course activity indicators such as indicators 240 and 250 are generated by the course activities generator 173. The course graphics preferably also includes a current time period indicator 270, in the form of a dashed rectangle spanning each of the course timelines 220–224. The current time period indicator 270 is generated by the current period generator software 172. The current time period indicator 270 readily identifies the actual current time period relative to the course timeline. The current time period indicators gives students a visual perspective of the temporal portion of the course completed, and the portion still remaining.

The course site 200 also includes progress graphics that are generated by the progress graphic generator software 180. The progress graphics are designed to identify a particular student's progress in the performance of course activities. The progress graphics shown in FIG. 2 are in the form of shaded portions of the course timelines 220–223. The shaded portions begin at the leftmost time period of the timeline and extend to time period 260, 261, 262, and 263, respectively. The progress graphics may either be used to indicate the completion of course activities, or may indicate the last time period 230 in which a particular student accessed the course site 200. Student access indicators are generated by the student access generator software 181, whereas the activity completion indicators are generated by the activity completion indicator software 182.

A student 210 is preferably able to view the course timelines 220–223 of other students in the class course 201. This allows for students to compare their progress with that of other students so that students will be aware of their standing amongst their classmates. By seeing the pace of their classmates, the slower paced students are more likely to stay motivated and attempt to catch up in the performance of course activities.

The course site 200 also includes one or more hyperlinks 280 to other HTML documents 154 or sites. The hyperlinks 280 are generated by the hyperlink generator software 176 per the instructions stored in the course database 158. These sites may include the course schedule and syllabus, messages or alerts from the instructor or the school, gradebooks, and links to the accessing student's homepage, or the homepage or email address of the student's classmates or of the instructor. The student designators 210–213 may also be hyperlinked either to a homepage or an email template having the designated student's address automatically inserted into the template. Those skilled in the art will recognize that the hyperlinks shown in FIG. 2 and those discussed above are exemplary and other hyperlink strategies known in the art may be used with the present invention.

FIG. 3 illustrates an alternate embodiment of a course site at 300. The site 300 is similar to the course site shown in FIG. 2 in that it includes a course designator 301 and a plurality of student designators 310, 311, 312, 313, 314, 315, and 316 having corresponding course timelines 320, 321, 322, 323, 324, 325, and 326. The course timelines 320–326 are divided into time periods 330, some of which have bolded borders 332 to identify groupings of time periods. The course timelines 320–326 preferably have course activity indicators, such as assignment indicators 340 and quiz indicators 350. A control or instructor timeline 327 is preferably included on the site 300. A plurality of hyperlinks 380 allow direct connection to other sites, as well as opportunities to interact with classmates.

A plurality of module indicators 329 are associated with the control or instructor timeline 327. The module indicators 329 are positioned adjacent the timeline 327 to indicate on which time period 330 a module begins. A "module" as used herein is a portion of the coursework relating to a course topic, or a segment of the course as divided by the course syllabus. Each of the module indicators 329 are preferably hyperlinked to a module description, or a corresponding portion of the course syllabus. The module indicator shown as "0" may be used to provide students with a course overview or introduction. As shown, the module indicators 329 are adjacent only the course or instructor timeline 327, however, those skilled in the art will appreciate that the module indicators can be placed adjacent course timelines 320–326 as well.

The timelines 320–327 also preferably include a current time indicator 370. In FIG. 3, the current day indicator 370 is shown as a plurality of rectangles which highlight the current time period of the individual time periods 330. The course site 300 also includes a plurality of progress indicators 360, 361, 362, 363, 364, 365, and 366, each corresponding to a respective student 310–316. The progress indicators are in the form of a triangle, one apex of the triangle pointing to a time period relating to the progress of each individual student. The progress indicators may either indicate course activities completed, or may indicate the last time period for which the individual student accessed the course site or course materials.

The course timelines also include a starting date indicator 302 and an ending date indicator 303. The starting date indicator 302 and ending date indicator 303 are generated by the timeline graphic generators 171 and 174 from data stored in the course database 158.

The course site 300 also includes a box 319 adjacent each of the student designators 310–316. The boxes 319 allow the user to send the same communication to more than one classmate at a time. The user may select the boxes 319 adjacent the student designations 310–316 of the student(s) the user wishes to communicate with, preferably by a click of the mouse. An "x" or other mark identifies the boxes selected. The user then may access an email template by selecting hyperlink 394. The email template will have all the email addresses of the selected students automatically loaded into the template. The boxes 319 and hyperlink 394 allow for particularly efficient communication of students working on group projects, and are generated and controlled by the communication software 190.

Those skilled in the art will appreciate that the course sites 200 and 300 illustrated in FIGS. 2 and 3, respectively, are exemplary and that various modifications and alterations may be made without departing from the scope of the present invention. For example, while the embodiments shown have either a student access indicator or an activity completion indicator, the progress graphics could include both indicators. This could be accomplished by using both the shading technique of FIG. 2 (see the terminal shaded time periods 260–263) and the triangular indicators 360–366 of FIG. 3 on the same course site. Furthermore, it should be apparent to those skilled in the art that the other shapes, in addition to triangles and rectangles, may be used to represent the indicators. In another example, while FIGS. 2 and 3 have shown the course activity indicators only as A's and Q's, other indicia, such as V (for video), G (for group activity), or P (for presentation) or others, are just as effective, as would be pictorial icons. In yet another example, while the timelines have been shown as uni-dimensional, other configurations, such as a matrix or calendar, may also be used to represent the course. In another example, timelines 224 or 327 are used to indicate the progress of the class or section as a whole, such as a class progress average or medium.

As mentioned above, the course sites of present invention are effective in providing a virtual classroom atmosphere in which students may see the progress of fellow students, thereby influencing their own motivation and performance. However, the course sites also give the instructor or school official an opportunity to enhance that motivation of the student by inserting a fabricated student into the class. As used herein, a fabricated student is not an actual student, but rather is information stored in the student and/or course database and used by the fabricated student generator software 175 to create the appearance of an actual student in the classroom. A fabricated student will have a student designator and a corresponding course timeline just like the actual students. However, the progress of the fabricated student, as identifiable by generated progress graphics, will be determined by the instructor or school administrator.

A fabricated student is most useful where the actual students in the class have fallen behind in the pace to complete the course. For example, when the actual students have progress indicators significantly behind the current time period indicators, seeing the progress of a fabricated student that is significantly better than their own is likely to motivate the students to start working harder to avoid feeling like they are being left behind. Thus, the fabricated student is preferably a trend-setter student. As used herein, a trend-setter student is a fabricated student whose is generally ahead of the other students, and/or is "caught up", that is, the progress is generally where it should be according to the course syllabus of course activities. For example, in FIG. 2, student designator 213 and progress indicator 263 may identify a fabricated student that is both ahead of his classmates and caught up in classwork so that the classwork assigned through the current time period has been completed. Likewise, in FIG. 3, student designator 312 and progress indicator 362 may identify a fabricated student who is both ahead of her classmates and caught up in classwork through the current time period. While in the preferred embodiments just described the fabricated student is ahead of the other student and/or is caught up in his or her classwork, in alternate embodiments, the fabricated trend-setter student may not be the student with the most advanced progress, but may be a student with generally more progress than most of the students. For example, in FIG. 3, either student designator 314 or 316 could be a fabricated trend-setter student.

A fabricated student may also be a slow-paced student. As used herein, a slow-paced student is a fabricated student whose is generally behind in progress compared to most or all of the other students. A fabricated slow-paced student prevents slower students from becoming overwhelmed with anxiety or a defeatist attitude if they fall behind, because the student believes that at least one or more other students may be in the same predicament. For example, in FIG. 3, student designator 310 and progress indicator 360 may represent a slow-paced fabricated student whose progress is behind all the other students. Alternately, student designator 313 and progress indicator 363 may represent a slow-paced fabricated student whose progress is only slightly ahead of the slowest student, thereby giving the slowest student motivation to try to catch up and not be the slowest student in the class.

Figure 4:
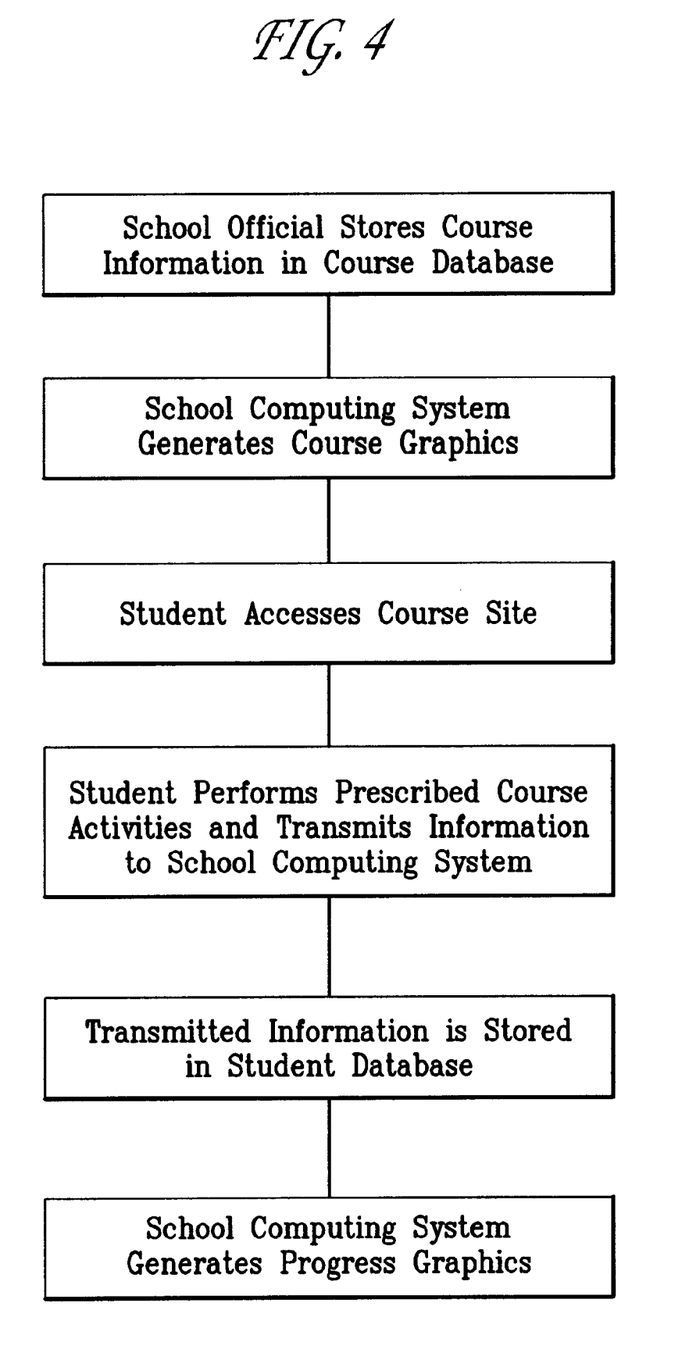
FIG. 4 is a flow chart representing a method for tracking the progress of one or more students in a class course.

Turning now to FIG. 4, a method for tracking the progress of one or more students in a class is shown generally at 400.

A school official, such as a course instructor, first stores the course data in course database 158. The course data includes information such as the course designation, the course dates and schedule of activities, as well as the actual course materials, such as assignments and quizzes, to be completed by the students. The school official will also enter data relating to which of the students listed in the student database will be enrolled in the course. The school official will also enter miscellaneous information, such as grading policies, class sections, etc.

The school official may then instruct the school computing system, utilizing software 160, to generate course graphics to be displayed on the course site. Here the school official will decide whether the course schedule should be represented by a divided timeline, a matrix, a calendar, etc. The school official may choose to designate students by their name, or by a student number or pseudo-name. The school official may also specify the scope of the students' access to certain types of information. The school official may also decide here how to display the students' progress, and whether to incorporate one or more fabricated students into the class.

After the course has been set-up by the school, the student may then access the course site, preferably either from the student's personal home computer or a public computer station, either of which are connected by a communication link 140 to the server 152. Communication software 190 provides restrictive access, for example, allowing only students who are registered in the course to view the course site, and limiting a student to his or her own gradebook. The restrictive access is preferably based upon a login and password, or any of the methods known in the art.

After viewing the course graphics and determining the assigned coursework, the student follows the hyperlinks and performs the prescribed coursework. The information relating to the student's work is then transmitted to the school computing system 150, and stored in the student database 157. Alternately, the information may be stored in the course database 158. The school computing system 150, utilizing the progress graphic generator software 180, then automatically generates progress graphics for the course site each time a student or school official requests to view the progress graphics. As previously mentioned, the progress graphics may include activity completion indicators, last access indicators, or some other indication of a particular's students progress. The generated graphics are then available for display on a course site HTML document when accessed through the server 152.

Although several embodiments directed to individual student progress monitoring have been described above, other embodiments are contemplated that juxtapose statistics of the different course sections for a course. For example, rather than displaying individual progress, an instructor may wish to view the average progress of his section against the average progress of another section that started the course at the same time. Alternately, information on the average progress of a section, historically, at a specific time from the course starting point, may be presented to gauge how the instructor's present section compares to past sections. The instructor may enable students in his section to view concurrent, or prior, section progress to build morale and competitiveness. School faculty may also utilize such section comparisons to assist in improving instructor performance.

While the invention has been described in conjunction with several specific embodiments, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

What is claimed is:

1. A method of tracking the progress of at least one student in a class course, the method comprising:
   providing a computer network including a school computing system and at least one student computer connected by a communication link;
   storing data in said school computing system relating to a course;
   generating at least one course graphic representative of the course;
   transmitting information relating to performance of course activities from said at least one student computer to said school computing system via said communication link;
   storing data in said school computing system relating to the progress of at least one student in the course based upon said transmitted information; and
   generating at least one progress graphic representative of the progress of said at least one student in the course;
   wherein said at least one student comprises a plurality of students, and at least one of said plurality of students comprises a fabricated student.

2. The method of claim 1, wherein said at least one course graphic and said at least one progress graphic are displayed by said at least one student computer.

3. The method of claim 1, wherein said communication link comprises the Internet.

4. The method of claim 1, wherein said at least one course graphic comprises a course timeline.

5. The method of claim 4, wherein said timeline is divided into segments representing discrete time periods.

6. The method of claim 5, wherein said time periods comprise days.

7. The method of claim 4, wherein said at least course timeline comprises at least one course activity indicator.

8. The method of claim 7, wherein said at least one course activity indicator comprises at least one assignment indicator.

9. The method of claim 7, wherein said at least one course activity indicator comprises at least one quiz indicator.

10. The method of claim 1, wherein said at least one course graphic comprises a course timeline for each of said at least one student.

11. The method of claim 1, wherein said at least one student comprises a plurality of students divided into sections, and wherein said at least one course graphic comprises a course timeline for each section of students.

12. The method of claim 1, wherein said at least one progress graphic comprises a course activity completion indicator.

13. The method of claim 1, wherein said at least one progress graphic comprises a student access indicator.

14. The method of claim 1, wherein said at least one course graphic filter comprises a current time period indicator.

15. The method of claim 1, wherein said fabricated student comprises a trend-setter student.

16. The method of claim 1, wherein said fabricated student comprises a slow-paced student.

17. A system for tracking the progress of at least one student in a class course, comprising:

a computer network including a school computing system and at least one student computer connected with said school computing system by a communication link;

said school computing system including at least one database adapted to store data relating to the performance of course activities by at least one student in the course;

a course graphic generator adapted to generate at least one course graphic representative of the course;

a progress graphic generator adapted to generate at least one progress graphic representative of the progress of said at least one student in the course; and a fabricated student graphic generator adapted to generate at least one graphic representative of a targeted progress level.

18. The system of claim 17, wherein said communication link comprises the Internet.

19. The system of claim 17, wherein said course graphic generator comprises a course timeline generator.

20. The system of claim 17, wherein said course graphic generator further comprises a current time period indicator generator.

21. The system of claim 17, wherein said progress graphic generator comprises an activity completion indicator generator.

22. The system of claim 17, wherein said progress graphic generator comprises a student access indicator generator.

* * * * *